Oct. 11, 1927.
F. G. SCOTT
1,645,458
OPERATING MECHANISM FOR ICE CREAM FREEZERS
Filed May 29, 1926   2 Sheets-Sheet 1
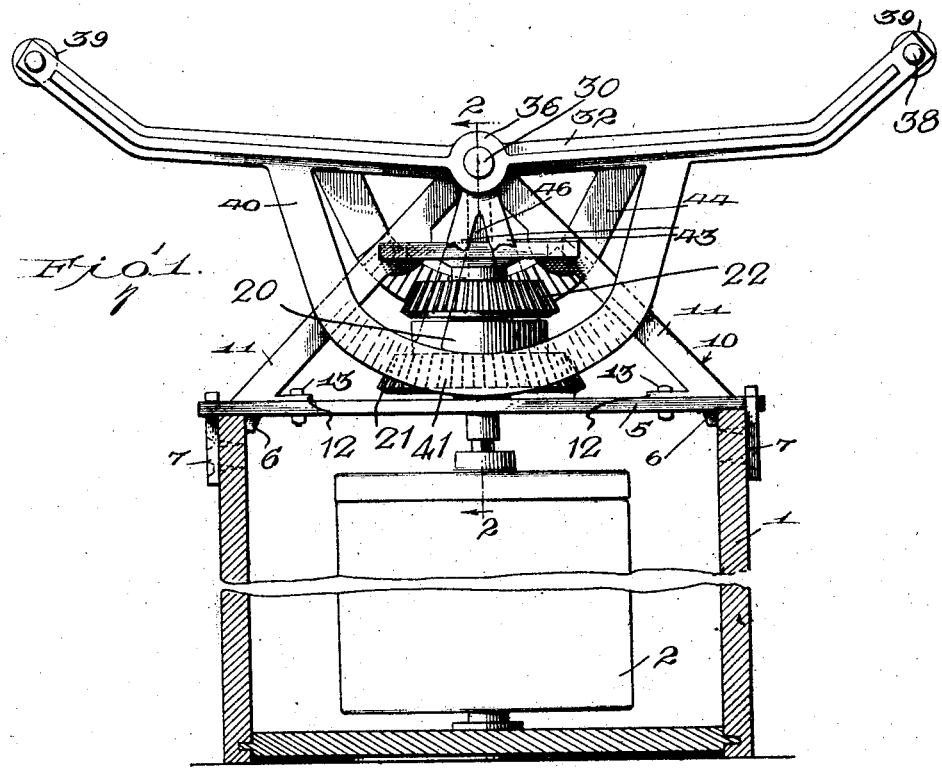
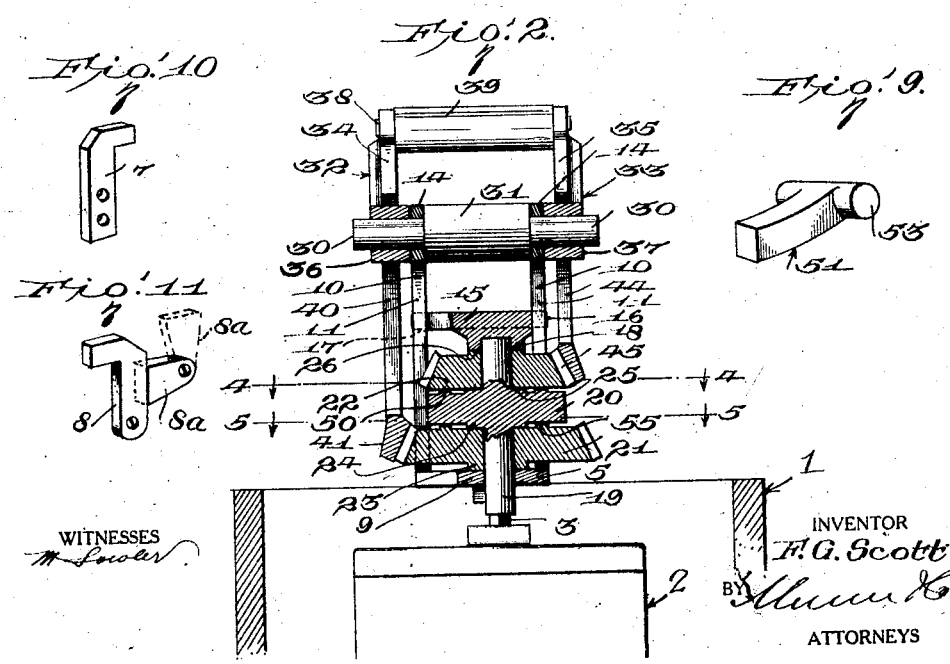
INVENTOR
F. G. Scott
BY
ATTORNEYS
WITNESSES

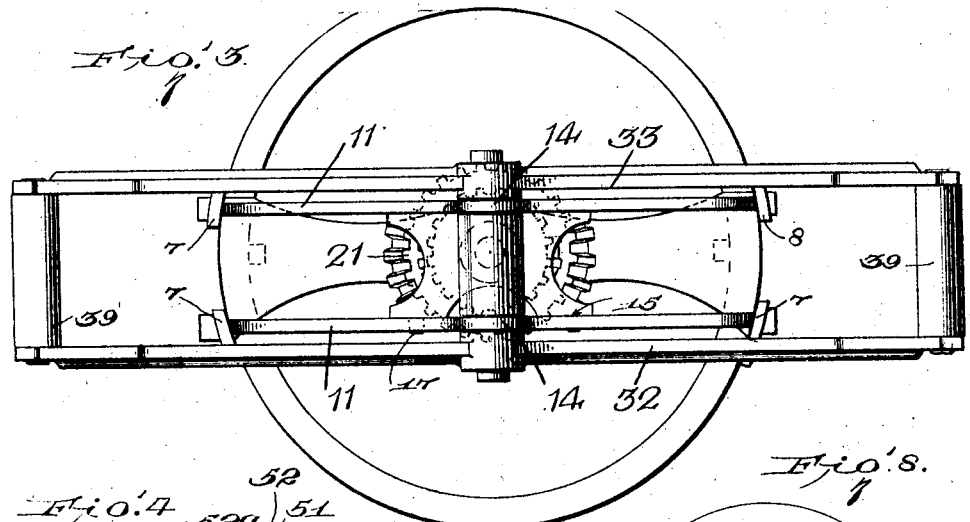
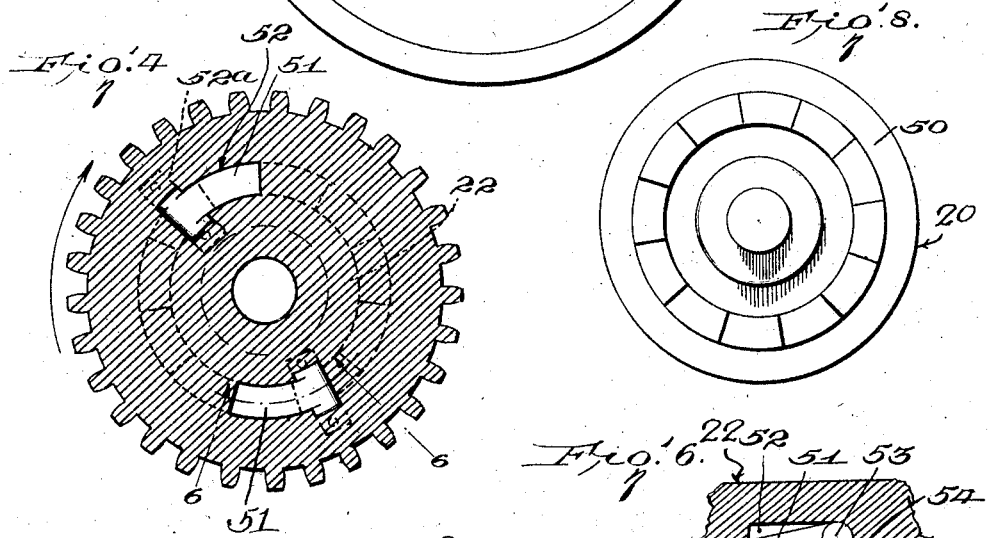
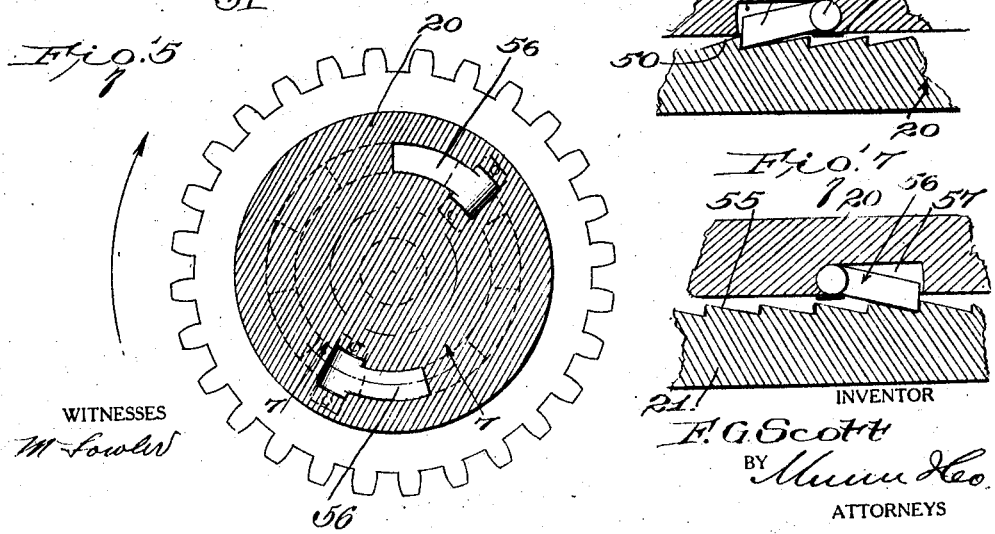

Patented Oct. 11, 1927.

1,645,458

UNITED STATES PATENT OFFICE.

FRANK G. SCOTT, OF NEW ORLEANS, LOUISIANA.

OPERATING MECHANISM FOR ICE-CREAM FREEZERS.

Application filed May 29, 1926. Serial No. 112,649.

This invention relates to an improvement in operating mechanism for ice cream freezers or the like and aims to provide a novel and effective means for continuously rotating the dasher of the ice cream freezer while permitting the operator to actuate the operating mechanism by an up and down rocking movement. This has the advantage of greatly reducing the amount of tedious and laborious effort that must be expended to actuate the operating mechanism and yet the dasher is continuously rotated at a uniform speed and with a smooth and easy motion.

A further object is to provide a device of this character and having these advantages and capacities and which is of simple and durable construction, reliable and efficient in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in section showing an operating mechanism for ice cream freezers embodying the present invention, Figure 2 is a view in transverse vertical section on the line 2—2 of Figure 1, Figure 3 is a plan view of the device, Figures 4 and 5 are views in horizontal section on the lines 4—4 and 5—5, respectively, of Figure 2, Figure 6 is a fragmentary view in vertical section on the line 6—6 of Figure 4, Figure 7 is a similar view on the line 7—7 of Figure 5, Figure 8 is a plan view of the disc or plate, Figure 9 is a detail perspective view of one of the pawls employed, Figure 10 is a detail view of one of the fixed lugs that may be employed to secure the base of the operating mechanism and the tub or outer container of the ice cream freezer, and Figure 11 is a detail view of the swingable lug and its locking block.

Referring to the drawings wherein for the sake of illustration is shown one embodiment of the invention, the numeral 1 designates a tub of an ice cream freezer which is of any preferred construction and in which the can 2 is mounted and held in any standard or desired way. In the can the usual dasher or agitator is provided and has a shaft 3 projecting upwardly therefrom and actuated from the operating mechanism which constitutes the present invention.

This operating mechanism comprises a base bar 5 extending transversely across the top of the tub 1 and having downwardly directed lugs 6 engaging the inner periphery of the tub. The base 5 may be held to the tub in any suitable way and as illustrated in Figure 10 the tub may have three fixed L-shaped lugs 7 secured to the tub and engageable with the projections of the base and a single swinging L-shaped lug 8 pivoted to the tub and also engageable with the projections of the base and releasably held in such engagement by a swingable lock block 8ª pivoted to the tub and co-operable with the lug 8.

As clearly shown in Fig. 3 the end portions of the base 5 are offset to one side of the central portion thereof and centrally of the central portion a bearing 9 is provided.

Spaced and parallel bracket members 10 are mounted on the base 5, each bracket member being inverted V-shaped in form and having inclined legs 11 terminating in feet 12 secured by bolts and nuts 13 to the base 5. The inclined legs of each bracket member merge into a hub 14 at their upper ends. A bearing plate 15 is provided and is located between the bracket members 11, the bearing plate having a laterally directed pin 16 snugly fitted in sockets 17 provided in the bracket members. On its underside and offset from its center the plate 15 is provided with a bearing socket 18 which receives the upper end of the shaft 19, the shaft 19 having its lower portion rotatably mounted in the bearing 9 of the base 5 and being connected below the bearing of the base with the dasher of the ice cream freezer.

Intermediate the plate 15 and the base 5 the shaft 19 has integrally formed therewith a plate or disc 20. Below the disc 20 a large bevel gear wheel 21 is loosely mounted on the shaft 19 and above the disc 20 a small bevel gear wheel 22 is also loosely mounted on the shaft 19. The large bevel gear wheel 21 has a collar 23 projecting from its lower side with its end engaging the base 5 while the upper face of the gear wheel 21 is engaged adjacent its center by a similar collar 24 formed on the plate 20 and depending therefrom. The plate 20 also has an upwardly directed collar 25 engaging the inner portion of the gear wheel 22 and the upper face of the gear wheel 22 has an upwardly directed collar 26 integral therewith and engaging the lower end of the socket 18.

In the hubs 14 of the bracket members 10 reduced extensions 30 of an axle 31 are mounted, the reduced extensions projecting beyond the bracket members as illustrated in Figures 2 and 3. On the reduced extensions 30 rockers 32 and 33 are mounted for free oscillatory or rocking movement. The rockers 32 and 33 are made up of main bars 34 and 35 having hubs 36 and 37 at their centers in which hubs the reduced extensions 30 are fitted. Beyond the hubs the bars 34 and 35 incline upwardly for a substantial portion of their length at a relatively slight angle but the end portion of the bars 34 and 35 incline sharply upwardly and are connected by cross bolts 38 having sleeve grips 39 mounted thereon. The rocker 32 has depending therefrom a relatively large curved bar 40 provided with a gear segment 41 which meshes with the large pinion 21. The curved bar 40 is braced by means of a plurality of brace bars 43. The rocker 33 also has depending therefrom a curved bar 44 which is somewhat smaller than the bar 40 of the other rocker and which has a small gear segment 45 formed thereon meshed with the small pinion 22. The curved bar 44 is braced by means of a brace bar 46.

With this arrangement when the grips 39 are grasped and the rockers are rocked about the axle 31 they will turn the gear wheels 21 and 22 first in one direction and then in the other. The gear wheels are loose on the shaft 19 but due to the provision of ratchet mechanism now to be described between the gear wheels and the disc or plate 20 the shaft 19 will be continuously rotated as the gears 21 and 22 are oscillated back and forth. In carrying out this purpose the upper face of the disc 20 is provided with a circular series of ratchet teeth 50, having the high points of their faces located above the face of the disc 20 and merging into the upper face of the disc 20 at their lowest points. Curved pawls 51 co-act with these teeth 50, the pawls 51 being loosely fitted in slots 52 provided in the lower portion of the gear wheel 22. These curved pawls 51 may be pivotally mounted on the gear wheel 22 in any approved manner but preferably this pivotal mounting is accomplished by providing trunnions 53 on the pawls 51 and confining these trunnions in lateral extensions 52ª of the slot 52 by means of plates 54 soldered, welded, or otherwise suitably fastened to the gear wheel 22. Similar though oppositely disposed ratchet teeth 55 are provided on the upper face of the gear wheel 21 and these teeth 55 co-act with pawls 56 similar to the pawls 51 though oppositely arranged, the pawls 56 being pivotally mounted in grooves or slots 57 formed in the underside of the disc 20. Preferably at least two pawls 51 and at least two pawls 56 are provided and these pawls are so located with respect to the ratchets with which they co-act that when one pawl 51 or 56 engages a ratchet tooth the other pawl 51 or 56 is half way between the ratchet teeth. This feature has the advantage of minimizing the lost motion. This ratchet organization results in a continuous rotation of the shaft 19 when the rockers are rocked and the gear wheels 21 and 22 turn back and forth for the reason that when the gear wheel 22 is turned as shown by the arrow in Fig. 4 its pawls 51 will engage the ratchet teeth 50 and rotate the disc 20 and consequently the shaft 19. At such time the pawls 56 play idly over the teeth 55. Then on the opposite movement the pawls 56 engage the teeth 55 to continue to rotate the shaft 19 in the same direction while the pawls 51 are playing idly over the teeth 50.

I claim:—

1. An operating mechanism of the character described comprising a shaft having a plate fixed thereto, said plate having ratchet teeth on one face, pawls on the other face of the plate, gears located face to face on opposite sides of the plate, one of the gears having pawls on one face co-operable with the teeth of the plate, the other gear having teeth on one of its faces co-operable with the pawls of the plate, and means for oscillating the gears.

2. An operating mechanism of the character described comprising a shaft, a disc fixed to the shaft, one face of the disc having a circular series of upwardly directed ratchet teeth, the other face of the disc having arcuate slots formed with lateral extensions, curved pawls loosely fitted in the slots and having trunnions loosely fitted in the lateral extensions thereof, means for confining the trunnions in the lateral extensions while permitting rotary movement thereof, gear wheels rotatably mounted on the shaft on the opposite sides of the disc, one of said gear wheels having a circular series of upwardly directed ratchet teeth engageable with the pawls of the disc, the other gear wheel having arcuate slots formed with lateral extensions in the face thereof adjacent the disc, curved pawls loosely fitted in the slots of the gear wheel and having trunnions rotatably fitted in the lateral extensions thereof, means for confining said last-mentioned trunnions to rotatable movement in the lateral extensions of the slots in which they are received, and means for oscillating the gears.

3. An operating mechanism of the character described comprising a base having a bearing at its center and having ends provided with mounting means, spaced bracket members secured to the base, a bearing plate removably secured to the bracket members, a shaft rotatably mounted in the bearing plate and in the base, a disc fixed to the shaft and having ratchet teeth on one side and pawls on the other, gears located on the opposite sides of the disc, one of the gears having pawls engageable with the ratchet teeth of the disc and the other gear having teeth engageable with the pawls of the disc, and rockers mounted for rocking movement on the bracket members and having gear segments meshed with the gears.

4. An operating mechanism for ice cream freezers comprising a base having a central bearing and offset ends provided with mounting means, spaced brackets mounted on the base and located at different distances from the center thereof, a bearing plate having a releasable mounting on the bracket members and provided with an offset bearing socket, a shaft rotatably mounted in the bearing socket of the plate and the bearing of the base, a disc integral with the shaft and having ratchet teeth on its upper side and pawls pivoted to its lower side, a small upper gear rotatably mounted on the shaft above the disc, a large lower gear rotatably mounted on the shaft below the disc, the upper gear having pawls engageable with the teeth of the disc, the lower gear having teeth engaged by the pawls of the disc, the teeth and pawls of the disc and upper gear being oppositely directed with respect to the teeth and pawls of the disc and lower gear, and means for oscillating the gears and including a pair of rockers rotatably mounted on the brackets, handle members connecting the rockers for simultaneous movement, one of the rockers having a large gear segment meshing with one side of the large gear, the other rocker having a small gear segment meshing with the opposite side of the small gear.

FRANK G. SCOTT.